May 18, 1954  W. L. CROWDER  2,678,675
PUNCTUREPROOF TIRE
Filed June 13, 1952  2 Sheets-Sheet 1
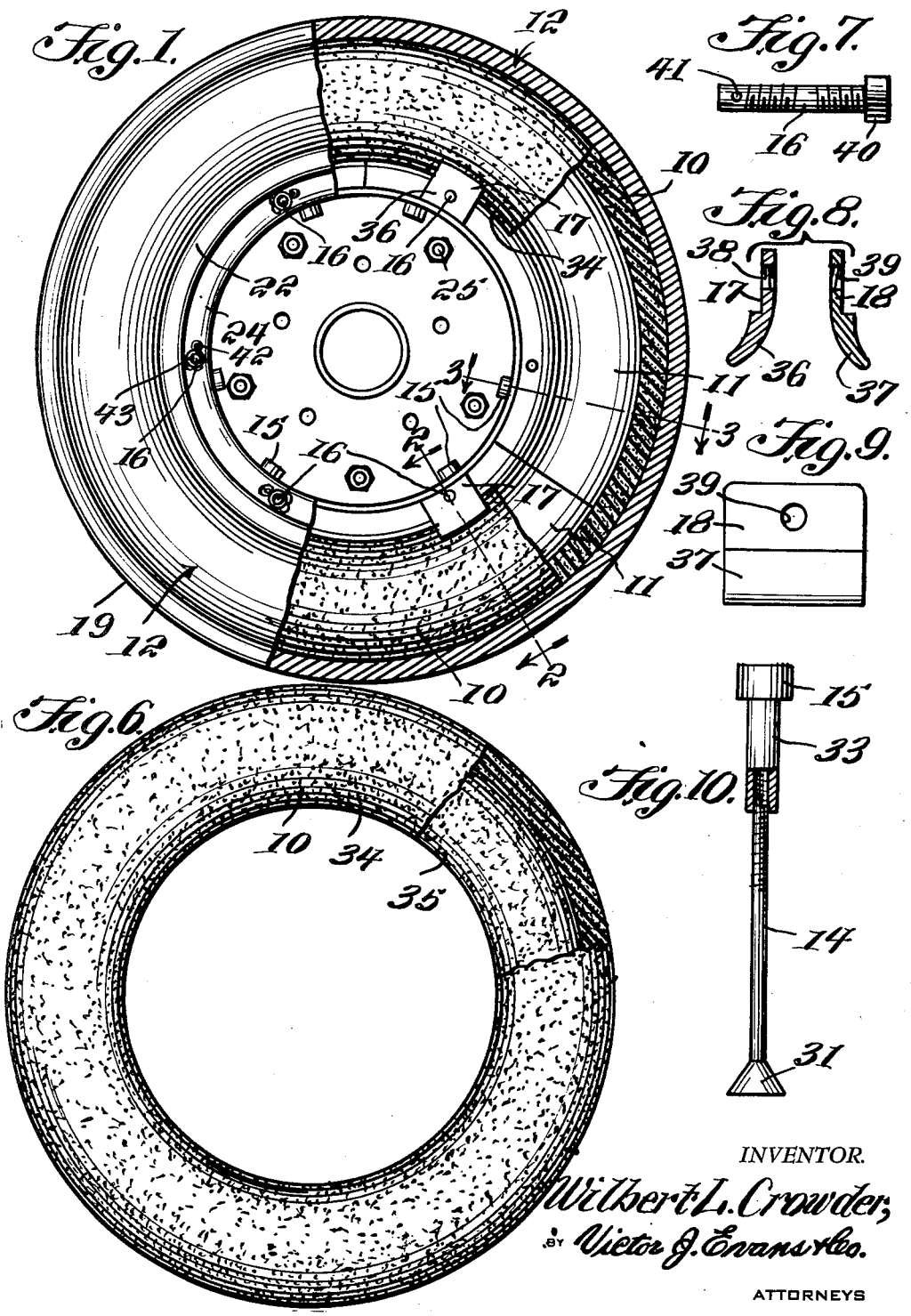
INVENTOR.
Wilbert L. Crowder;
BY Victor J. Evans & Co.
ATTORNEYS

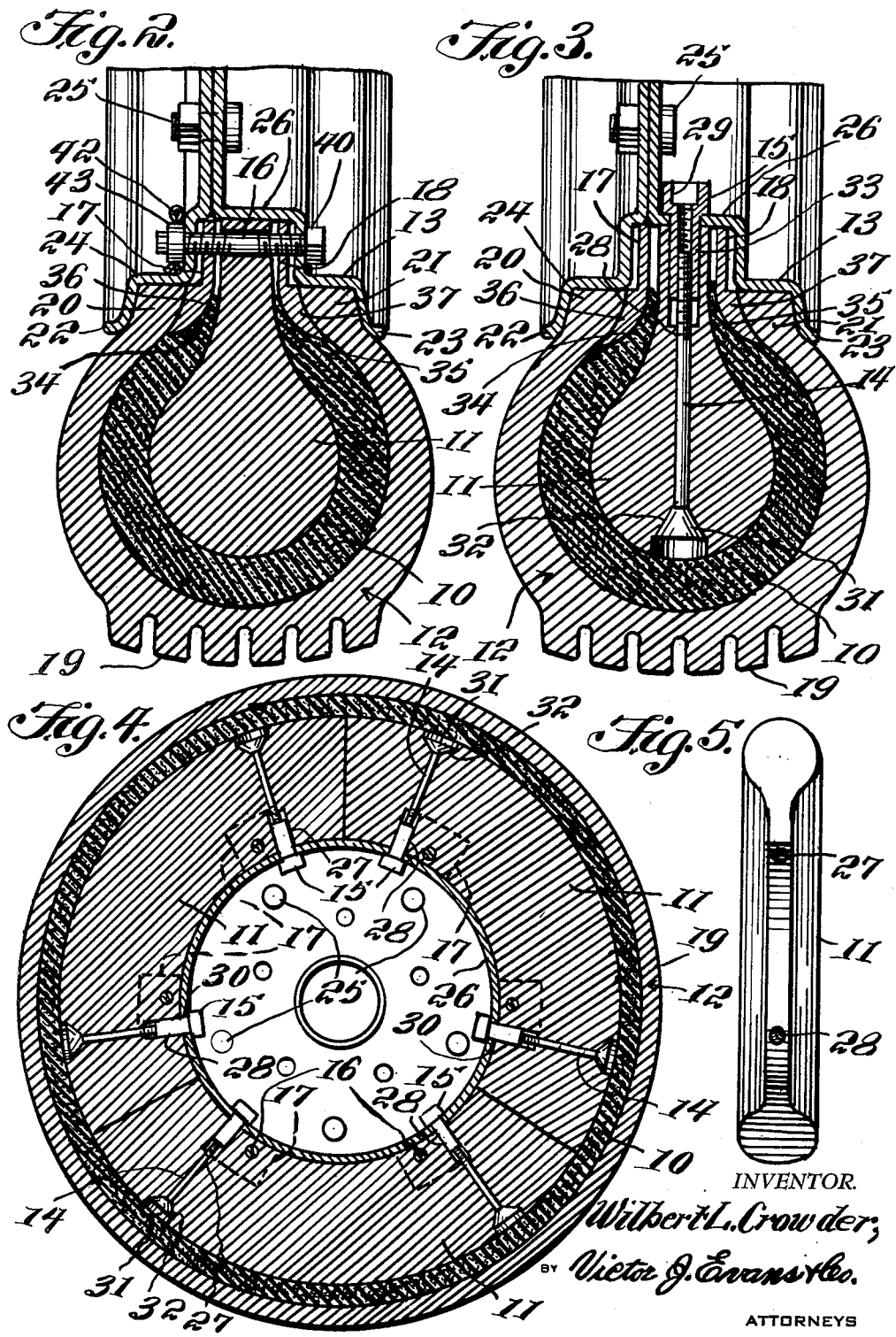

Patented May 18, 1954

2,678,675

UNITED STATES PATENT OFFICE 2,678,675

PUNCTUREPROOF TIRE

Wilbert L. Crowder, Detroit, Mich.

Application June 13, 1952, Serial No. 293,358

1 Claim. (Cl. 152—313)

This invention relates to motor vehicles tires of the solid type in which compressed air is not used, and in particular a tire having a conventional shoe or outer section with a solid rubber core and with a sponge rubber layer or section between the core and shoe.

The purpose of this invention is to provide means for obtaining resiliency in a motor vehicle tire without danger of flat tires or blowouts.

Various attempts have been made to combine steel and other metal linings with tires and also to form tires of the solid type with air cells and other elements. However, it is difficult to provide a tire of this type that gives the same resiliency as a pneumatic tire, or that can be incorporated in a conventional tire or shoe.

With this thought in mind this invention contemplates a tire including a shoe mounted on a conventional rim with a solid core of resilient material bolted to the rim and with a continuous sponge rubber filler positioned between the core and tire and secured in position with clamps secured by bolts extended through the rim.

The object of this invention is, therefore, to provide means for incorporating a resilient section in a motor vehicle tire of the pneumatic type whereby resiliency is obtained without the use of air or other fluid.

Another object of the invention is to provide an improved motor vehicle tire of the solid type in which resiliency is obtained with resilient elements incorporated in a tire and in which said resilient elements are adapted to be installed in a conventional tire.

A further object of the invention is to provide a resilient core for tires of motor vehicles wherein air or other fluid is not required, in which the core is of a simple and economical construction.

With these and other objects and advantages in view the invention embodies a motor vehicle tire having a conventional shoe with a solid resilient core formed in sections and with each section bolted to a rim, and an intermediate layer or web of spongy resilient material positioned between the core and shoe.

Other features and advantages of the invention will appear from the following description taken in connection with the drawings, wherein:

Figure 1 is a side elevational view showing the improved tire with parts broken away and with parts shown in section.

Figure 2 is a cross section through the tire taken on line 2—2 of Fig. 1, showing the clamping elements for securing the sponge rubber web in position.

Figure 3 is a cross section taken on line 3—3 of Fig. 1 showing the bolts for securing the core to the rim.

Figure 4 is a longitudinal section through the tire illustrating the solid rubber segments and showing the sponge rubber web positioned between the segments and shoe.

Figure 5 is a detail illustrating one of the solid rubber segments used in the tire.

Figure 6 is a side elevational view illustrating the filler elements of the tire showing the sponge rubber web positioned over the core and with part of the web broken away and shown in section.

Figure 7 is a detail illustrating a bolt having right and left hand threads with which clamps are drawn together for securing the sponge rubber web in position in the tire.

Figure 8 is a detail showing a section through the clamp.

Figure 9 is a side elevational view of one of the clamps.

Figure 10 is a detail illustrating one of the bolts for securing the solid rubber core to the rim of the wheel.

Referring now to the drawings wherein like reference characters denote corresponding parts the improved puncture proof tire of this invention includes a substantially continuous sponge rubber web 10, segments 11 of solid rubber or the like providing a core, an outer shoe 12, a rim 13, bolts 14 having socket nuts 15 threaded thereon for retaining the segments or core to the rim and studs 16 having right and left hand threads for securing clamps 17 and 18 which hold the inner edges of the web 10 to the rim.

The improved tire elements are incorporated in the conventional shoe, as indicated by the numeral 12, which is provided with a thread 19 and beads 20 and 21 which are nested in flanges 22 and 23, respectively of the rim 13. It will be understood, however, that the shoe may be of any suitable type or design.

In the design shown the rim 13 is formed of two sections, with one section indicated by the numeral 13 and with a removable section indicated by the numeral 24. The sections are secured together with bolts 25 and the inner parts are formed inwardly to provide a well or groove as indicated by the numeral 26.

The segments 11, which form the core, are preferably formed of solid rubber and, as illustrated in the drawing, each segment is provided with two openings 27 and 28 through which the bolts 14 extend and although three segments are shown, it will be understood that any suitable number of segments may be used.

The segments are bolted to the section 26 of the rim with the elongated socket nuts 15 having wrench receiving sockets 29 in the outer ends extended through openings 30 in the rim and into the openings 27 and 28 of the segments. The bolts 14 are provided with heads 31, which are shaped to correspond with countersunk openings 32 in the segments, as shown in Fig. 3, and with the threaded ends extended into tubular sections 33 of the socket nuts the segments may be positively clamped to the rim.

With the segments secured in position the sponge rubber web 10 is placed over the segments and edges 34 and 35 of the web are gripped by sections 36 and 37 of the clamps 17 and 18. The clamps 17 and 18 are provided with threaded openings 38 and 39, one having a right hand thread and the other a left hand thread and these clamps are secured by the studs 16, which are also provided with right and left hand threads. The studs 16 are provided with heads 40 and openings 41 in the opposite ends are positioned to receive cotter pins as indicated by the numeral 42. The studs may also be provided with collars 43 through which the cotter pins extend.

With the sponge rubber filler or web in position on the core a tire or shoe is positioned thereon and the sections of the rim bolted together.

By this means a tire is provided which is not subject to punctures or blowouts and for this reason a safety tire is formed. The inner or filling elements are adapted for use in conventional tires or shoes and the tires may be used indefinitely or until the tread wears to the sponge rubber liner or web.

It will be understood that modifications, within the scope of the appended claim may be made in the design and arrangement of the parts of the tire without departing from the spirit of the invention.

What is claimed is:

In a motor vehicle tire, the combination which comprises a motor vehicle wheel rim, one side of said rim being removable, a plurality of segments substantially cylindrical in cross section, and having sections extended from inner sides thereof, bolts extended through the ends of said segments, securing the segments to the rim of the wheel, a continuous circular web of sponge rubber substantially U-shaped in cross section positioned over the segments, clamps positioned over the edges of the web, threaded studs extended through the rim and threaded in the clamps for securing the web in position upon the rim of the wheel, and an outer tire also substantially U-shaped in cross section, covering said sponge rubber web, the heads of said outer tire being secured in the rim.

References Cited in the file of this patent

UNITED STATES PATENTS

| Number | Name | Date |
| --- | --- | --- |
| 1,255,903 | Martineau et al. | Feb. 12, 1918 |
| 1,374,390 | Rode, Jr. | Apr. 12, 1921 |